July 28, 1959     F. D. PATTI     2,897,321
CONTROL UNIT FOR ELECTRIC HEATING APPLIANCES
Filed April 30, 1958
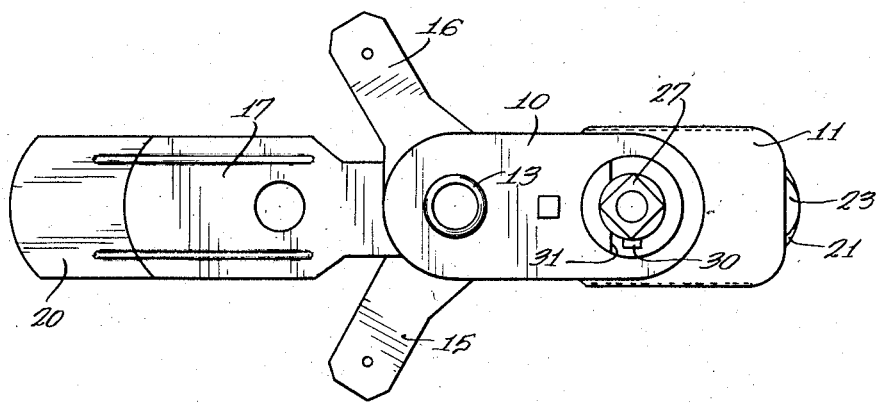
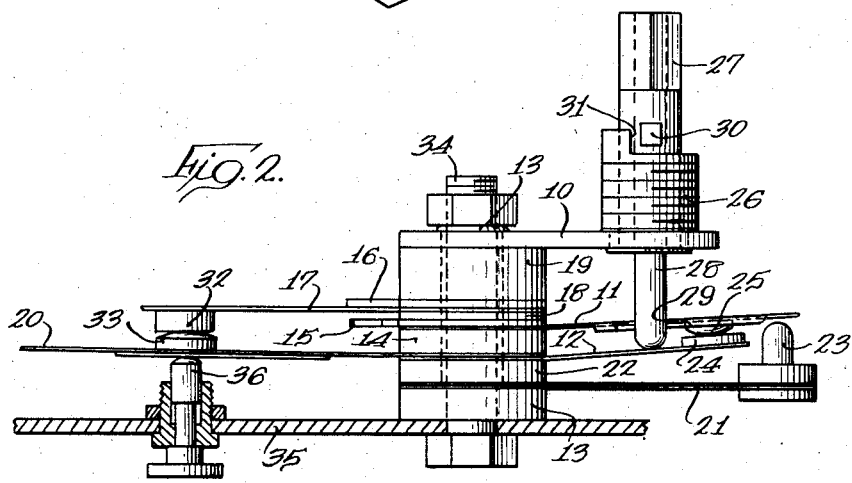
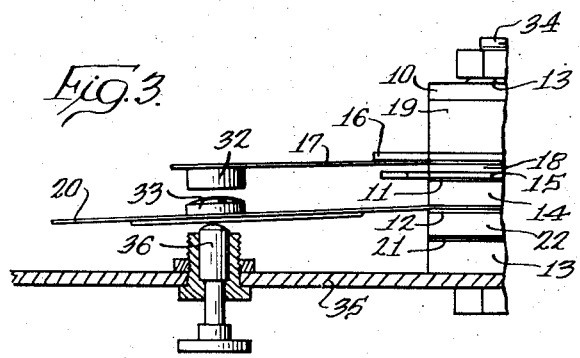
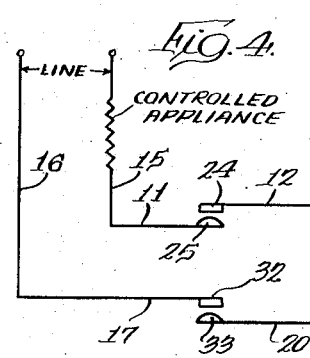
INVENTOR.
Fred D. Patti
BY Stanley Horsh
Atty.

United States Patent Office 2,897,321
Patented July 28, 1959

2,897,321

CONTROL UNIT FOR ELECTRIC HEATING APPLIANCES

Fred D. Patti, Morris, Ill.

Application April 30, 1958, Serial No. 732,087

5 Claims. (Cl. 200—138)

This invention relates to a control unit for an electrically heated appliance of the portable type wherein a heating element is energized by an electric circuit in response to actuation of a thermally sensitive switch.

In order to prevent operation of the heating element when the appliance is unintentionally displaced or tipped through loss of proper footing or support, it has been the practice to provide controls employing a plunger so mounted on the appliance as to have downward engagement with a supporting surface on which the base of the appliance rests when in a normal standing position whereby the plunger is moved to a retracted position under pressure applied against said supporting surface by the weight of the appliance, in response to which said controls are operated to close the circuit to the heating element. In the event the appliance falls by loss of such footing whereby the plunger loses the intervention of said supporting surface to maintain the plunger in retracted position, the plunger in response to suitable stress normally applied thereto is urged to an advanced position whereby the controls are placed in circuit opening position thus preventing operation of the heating element even though the appliance is not disconnected from the source of current supply and the thermally sensitive switch is responding to conditions calling for operation of the heating element.

In accordance with the present invention, means for preventing operation of the heating element when the appliance falls and loses its footing include controls which are so combined with a thermally sensitive switch assembly as to form a complete unit, thereby simplifying the manufacture and installation of a control unit for portable electric heaters.

It is accordingly an object of this invention to provide a control unit for portable electric heaters which is simple and convenient to manufacture and install and which eliminates added wiring and terminals heretofore required in such control devices.

These and other objects of the present invention will become more apparent during the course of the following description.

In the drawings:

Fig. 1 is a top plan view of a control unit embodying the features of the present invention.

Fig. 2 is a side elevational view thereof showing the position of the movable parts as they appear when the unit is operating to energize the heating element of a heater to which the unit is applied.

Fig. 3 is a fragmentary view similar to Fig. 2 showing the position of the movable parts as they appear when the circuit to the heating element is opened due to displacement of the appliance from a normal standing position.

Fig. 4 is a diagram of a circuit arrangement employing a control unit in accordance with the present invention.

Referring more particularly to the embodiment disclosed in the drawing, this invention is shown as applied to a heating appliance having a base designated by the reference numeral 35.

As shown, a thermally sensitive switch incorporating a preferred form of this invention, includes a mounting plate 10, a pair of elongated contact blades comprising a first contact blade 11 and a second contact blade 12, and a hollow supporting rivet or post 13 secured to and projecting angularly from the mounting plate 10 on which the blades 11 and 12 are arranged and supported in superposed aligned relation with the blade 12 and the plate 10 in straddling relation to the blade 11. An insulating spacer 14 is supported on the rivet 13 between the blades 11 and 12. A first wiring terminal 15 in conductive engagement with the contact blade 11 is separated from a second wiring terminal 16 in conductive engagement with a third elongated contact blade 17 by a second insulating spacer 18. A third insulating spacer 19 separates the mounting plate 10 from the wiring terminal 16. Numeral 20 designates a fourth elongated contact blade in conductive engagement with the mounted end of contact blade 12. An elongated bimetallic blade 21 is secured about the rivet 13 between a fourth insulating spacer 22 which separates the blade 21 from the contact blade 12 and an integral head on the rivet 13 which provides a fifth spacer separating the blade 21 from the base 35. The projecting ends of the contact blade 11 and the bimetallic blade 21 are offset from the corresponding end of the contact blade 12 in a direction away from the rivet 13 whereby the outer end of the contact blade 11 is engageable with an insulating button 23 mounted on the outer end of the blade 21. The contact blade 11 is resiliently biased toward the blade 21 so as to be normally held against the button 23 as the blade 21 is deflected in a direction away from the blade 11 from a position wherein the blade 21 is effective to maintain the blade 11 in circuit open relation to the blade 12. Pending such time as the temperature reaches a state at which the bimetallic blade 21 is deflected toward the blade 11 from the position shown in Fig. 2, cooperating contacts 24 and 25 on the blades 12 and 11, respectively, will remain in engagement. A nut 26 fastened through an opening in the mounting plate 10 at a suitable distance from the rivet 13 in the direction of the outer or projecting ends of the contact blades 11 and 12 is provided with a threaded adjustment shaft 27, said shaft 27 being thereby mounted in said nut 26 for relative axial movement in a path extending into the area between the mounting plate 10 and the contact blade 11 in response to rotation of the shaft 27. An insulating tip 28 secured to the innermost end portion of the shaft 27 and having entry to the space between the contact blades 11 and 12 via an opening 29 in the blade 11 for engagement by the surface of the blade 12 facing said tip 28, is accordingly movable for adjustment between selected positions axially of the shaft 27 in response to rotation of the latter. A radially extending lug 30 on the section of the shaft 27 projecting from the nut 26 in a direction away from the tip 28 cooperates with stops 31 defined by an axial extension of the bearing 26 to limit rotation of the shaft 27 between selected limits. The resilient bias of the contact blade 12 urges the blade 12 toward a position in engagement with the insulating tip 28 whereby the adjusted position of the tip 28 controls the spacing between the cooperating contacts 24 and 25 on the blades 12 and 11 so that such contacts are in disengaged relation when the shaft 27 is turned to an "off" position. According to the position of the blade 12 as determined by the adjusted position of the shaft 27 away from "off" position, the contacts 24 and 25 are likewise allowed to remain in engaged relation pending such time as the temperature reaches a state wherein the bimetallic blade 21 is deflected by thermal conditions to move the blade 11 away from the blade 12 and thereby move the contact 25 away from the contact 24.

It will be noted that each of the second pair of contact blades 17 and 20 is shown as extending from the supporting rivet 13 in a direction substantially opposite to the direction in which the first pair of contact blades 11 and 12 and the bimetallic blade 21 extend from said rivet. Such variance in direction may be modified to position the blades 17 and 20 in alignment at any selected angle relative to the position of the blades 11, 12 and 21 so as to provide a wide variety of arrangements to suit specific installation conditions. It is also within the scope of this invention to arrange the blades 17 and 20 in planes at an angle to the planes of the blades 11, 12 and 21.

Cooperating contacts 32 and 33 provided on the blades 17 and 20 respectively are biased to a normally open position as shown in Fig. 3 whereby movement of the cooperating contacts 24 and 25 on the blades 12 and 11 to an engaged position as shown in Fig. 2 is ineffective to close an electrical circuit from a source of electrical current connected to the wiring terminals 15 and 16. Such bias is established by the inherent stress of the blade 20 urging the same in a direction away from the blade 17 and toward the base 35. The blade 20, under the influence of such stress, is thereby operative to exert yieldable pressure against the inner end of a plunger 36 mounted in the area of the appliance base 35 facing the blade 20. By properly dimensioning the extension of the plunger 36 relative to the base 35 in a direction downwardly of the latter, the supporting surface on which the base of the appliance bears when in a position of rest thereon is adapted to move the plunger 36 to a retracted position, as shown in Fig. 2, under pressure exerted by the weight of the appliance relative to said supporting surface. Upon such retraction of the plunger 36, the blade 20 will yield and thereby move toward the blade 17 a distance sufficient to establish engagement of the contact 33 against the contact 32 of the blade 17 and responsive to such action, a closed circuit to the heating element of the appliance is established through the contacts 24 and 25 and the wiring terminals 15 and 16. When the plunger 36 is thereupon deprived of such intervention of the supporting surface, as for example when the appliance is toppled over on its side, the blade 20 is restored to a position separating the contact 33 from contact 32 to thereby open the circuit between the terminals 15 and 16 notwithstanding the fact that the contacts 24 and 25 on the blades 11 and 12 are in circuit closed position.

In accordance with the construction of a control unit as described herein, the mounting plate 10, spacer 23 and insulating spacers 14, 18, 19 and 22, the wiring terminals 15 and 16 and the second pair of contact blades 17 and 20 combine to form stack means which cooperate with the contact blades 11 and 12 and the bimetallic blade 21 to maintain said blades 11, 12 and 21 in clamped assembly about the hollow mounting post 13, with the blades 11 and 21 in straddling relation to the blade 12. The mounting post 13 is secured to the base 35 by means of a suitable fastening such as a bolt 34 projected through the member 13 as shown in the drawings.

The action of the plunger 36 in holding the contacts 32 and 33 in closed position while the appliance is in proper standing position or the action of the blade 20 in urging the plunger 36 in a direction to permit the contacts 32 and 33 to maintain an open circuit position while the appliance is dislodged from such standing position may be accomplished by a variety of other means as will be manifest to anyone skilled in the art. Accordingly the specific arrangement of the plunger 36 in relation to the appliance base as well as the blade 20 is not to be treated as an essential feature but only as a simple example of a trigger or actuating means with which the control unit of this invention is adapted to cooperate in a typical installation.

The present invention accordingly affords a substantial improvement in the construction of a control unit for electric heating appliances or the like and as will be readily apparent the novel manner of assembly of its various parts permits not only a very compact construction, but also provides a more efficient and less expensive unit than has heretofore been possible to obtain.

It is to be understood that the invention has been described with reference to specific embodiments thereof and that changes can be made therein which are within the full intended scope of this invention as defined by the appended claims.

What is claimed is:

1. In a control unit for an electric heating appliance, a switch having a pair of elongated metal contact blades including a first contact blade and a second contact blade, an elongated temperature responsive bimetallic blade, a mounting post, stack means for rigidly clamping said first and second contact blades and said bimetallic blade at one end thereof on said mounting post with said bimetallic blade and said first contact blade in straddling relation to said second contact blade, said first contact blade being movable relative to said second contact blade in response to movement of the bimetallic blade in the direction of said first contact blade, said stack means including a pair of wiring terminals and a second pair of elongated metal contact blades, one of said first named pair of contact blades being conductively joined to one of said wiring terminals, the other of said first named pair of contact blades being conductively joined to one of said second pair of contact blades, and the other of said second pair of contact blades being conductively joined to the second of said wiring terminals, and insulating spacers in said stack means including a spacer by which the wiring terminal and said contact of the first named pair of contact blades conductively joined to said latter wiring terminal are separated from the other of said wiring terminals, and a spacer by which the blade of the first named pair of contact blades and the blade of the second named pair of contact blades in conductively joined relation are separated from the other blade of said second named pair of contact blades and the other blade of said first named pair of contact blades, one of said second named pair of contact blades being movable relative to the other of said second named pair of contact blades between circuit closing and circuit opening positions and biased in circuit opening position whereby movement of the first contact blade into contact closing position relative to said second contact blade is ineffective to close an electrical circuit through said first and second contact blade via said wiring terminals except when said second named pair of contact blades are in circuit closing position.

2. In a control unit as set forth in claim 1, a mounting plate to which said mounting post is secured with the mounting plate and said second contact blade is in straddling relation to said first contact blade, and the position of the second contact blade relative to said mounting plate is determined by an adjustment shaft supported on said mounting plate.

3. In a control unit as set forth in claim 1 wherein said second named pair of contact blades extend from the mounting post in a direction at variance to the direction which the first named pair of contact blades extend from said mounting post.

4. In a control unit as set forth in claim 1 wherein the first contact blade is conductively joined to the first of said pair of wiring terminals and the second contact blade is conductively joined to one of said second named pair of contact blades.

5. In a control unit as set forth in claim 1 wherein the first contact blade is conductively joined to the first of said pair of wiring terminals and the second contact blade is conductively joined to one of said second named pair of contact blades, and said latter blade of said second named pair of contact blades is normally biased against movement toward the other of said second named pair of contact blades.

References Cited in the file of this patent

UNITED STATES PATENTS

| | | |
|---|---|---|
| 2,518,595 | Bletz | Aug. 15, 1950 |
| 2,590,600 | Farr et al. | Mar. 25, 1952 |